J. J. RATH.
LEAF SPRING CONNECTION.
APPLICATION FILED SEPT. 29, 1920.
1,423,255.
Patented July 18, 1922.
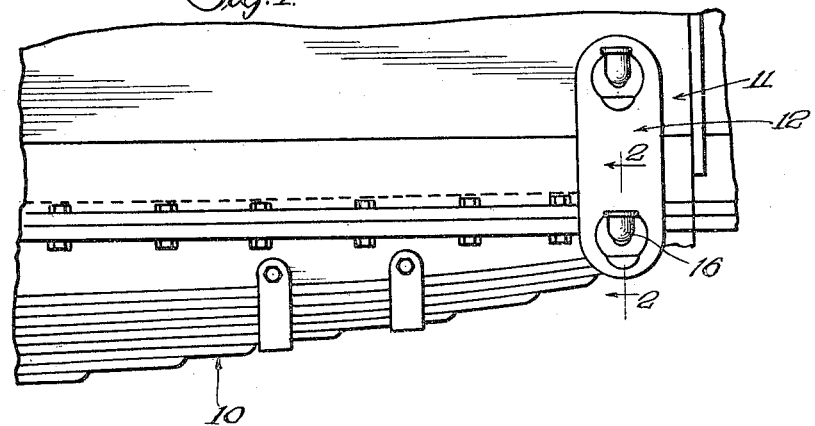
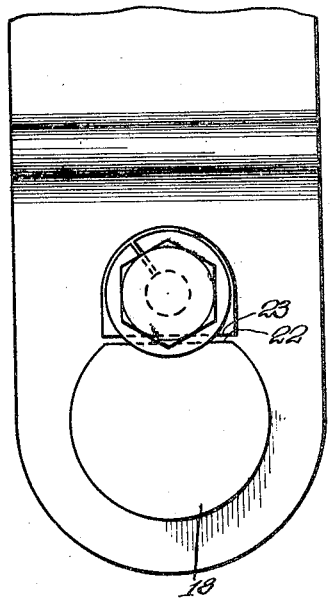
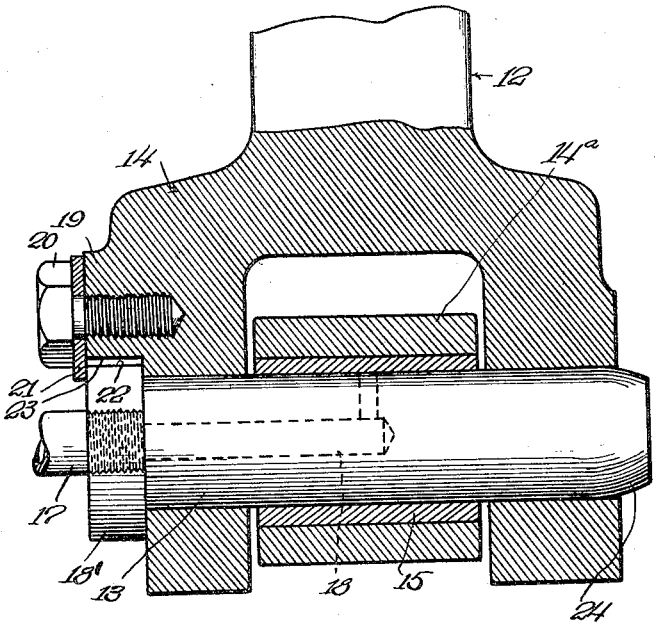
Inventor
Joseph J. Rath
By Jones, Addington, Ames & Seibold Attys

UNITED STATES PATENT OFFICE.

JOSEPH J. RATH, OF CHICAGO, ILLINOIS, ASSIGNOR TO THE AVAILABLE TRUCK COMPANY, OF CHICAGO, ILLINOIS, A CORPORATION OF ILLINOIS.

LEAF-SPRING CONNECTION.

1,423,255.　　　　Specification of Letters Patent.　　Patented July 18, 1922.

Application filed September 29, 1920. Serial No. 413,477.

*To all whom it may concern:*

Be it known that I, JOSEPH J. RATH, a citizen of the United States, residing at Chicago, in the county of Cook and State of Illinois, have invented new and useful Improvements in Leaf-Spring Connections, of which the following is a full, clear, concise, and exact description, reference being had to the accompanying drawing, forming a part of this specification.

My invention relates to a leaf-spring connection, and more particularly to a leaf-spring connection for automobiles.

One of the objects of my invention is to provide an improved leaf-spring connection for automobiles, which will facilitate the insertion and removal of the shackle-bolt which connects the end of the leaf-spring with the spring shackle.

Further objects will appear from the detailed description to follow and from the appended claims.

In the drawings in which an embodiment of my invention is shown;

Fig. 1 is a side elevational view showing a leaf-spring for automobiles and associated parts;

Fig. 2 is an enlarged sectional view on the line 2—2 of Fig. 1 showing the spring connection, and Fig. 3 is an elevational view from the left of Fig. 2.

The construction shown in the drawing comprises in a general way, a leaf-spring 10, a portion of the automobile or truck chassis 11, and a spring shackle 12 affording a pivoted link connection between the ends of the spring 10 and the chassis 11.

Referring in detail to the connection between the spring shackle or yoke 12 and the end of the spring 10, shown in Fig. 2, this comprises a shackle-bolt 13 extending through alined openings in the yoke portion 14 of the shackle 12, the end of the spring being bent to form an eye-portion 15 through which the shackle-bolt 13 is inserted. A suitable bearing bushing 15 may be provided between the eye-portion 14ª of the spring and the shackle-bolt.

An oil-cup 16 is provided, having a screw connection at 17 with the end of the shackle-bolt 13, the shackle-bolt being provided with an oil passage 18′ for conducting the oil to the inner surface of the bearing bushing 15. It is desirable that the shackle-bolt 13 should be easily accessible for removal and replacement, and it is also desirable that it should be held from rotation in order to hold the oil-cup 16 in upright position. For this purpose I have arranged the shackle-bolt so that it may be released for removal from the outer side of the shackle. With this in view, the outer end of the shackle-bolt 13 is provided with a head 18, which bears against the outer face of one arm of the yoke portion 14 of the shackle, the shackle 12 is provided with an overhanging shoulder portion 19, which overhangs the head of the shackle-bolt 13, and a cap screw 20 is threaded into this shoulder portion, which exerts a bearing pressure on the head 18 of the bolt 13 to prevent the shackle-bolt from slipping out endwise. A split washer 21 may be provided between the head of the cap screw 20 and the head 18 of the shackle-bolt, the edge of this split washer bearing on the head of the shackle-bolt, and also serving to keep the cap screw 20 from coming unscrewed. In order to prevent the shackle-bolt 13 from rotating, thus keeping the oil-cup 16 in upright position, the head 18 of the shackle-bolt is flattened as shown at 22 (Fig. 3) for engagement with the flat lower surface 23 of the overhanging shoulder portion 19 of the shackle.

To facilitate the insertion of the shackle-bolt, the inner end may be tapered as shown at 24.

In assembling the spring and shackle, the spring is placed in position so that the eye-portion 14ª will be in alignment with the openings in the yoke portion 14 of the shackle 12 and the shackle-bolt 13 is inserted through these aligned openings, the tapered portion 24 of the shackle facilitating the entrance of the shackle-bolt. The shackle-bolt is turned to bring the flattened portion 22 underneath the flat portion 23 of the overhanging shoulder 19, and the split washer 21 and cap screw 20 are then put in place, and the cap screw 20 is screwed in to cause the split washer to bear against the head of the shackle-bolt to securely hold the parts in assembled position. It will be noted that it is not necessary to get to the inside of the shackle either in inserting or removing the shackle-bolt, and that the shackle-bolt is securely held either from slipping out endwise or turning around in the shackle.

While I have shown but one embodiment of my invention, it may be embodied in other forms, covered and defined by the appended claims.

Having thus described my invention what I claim as new and desire to secure by Letters Patent of the United States is:

1. A spring connection construction comprising a yoke member, having aligned openings in its arms, a shackle-bolt extending through said openings, a leaf-spring having a portion surrounding said shackle-bolt between said arms, said shackle-bolt having a head engaging the outer face of one of said arms to position it, said head having a flat edge, one arm on the yoke having an overhanging shoulder having a flattened portion for engaging said flat edge to prevent rotation of said shackle-bolt, a screw threaded into said overhanging shoulder portion and bearing on the head of the shackle-bolt to hold it in position, said shackle-bolt having an oil passage leading from the headed end thereof to oil the spring connection, and an oil-cup secured to the head of said shackle-bolt in upright position, the engagement between said flat edge and said flattened shoulder portion serving to keep the oil-cup in upright position.

2. A spring connection construction comprising a yoke member, having aligned openings in its arms, a shackle-bolt extending through said openings, a tapered end for said bolt which facilitates placing said bolt in position, a leaf-spring having a portion surrounding said bolt between said arms, said shackle-bolt having a head engaging the outer face of one of said arms to position it, said head having a flat edge, one arm on the yoke having an overhanging shoulder having a flattened portion for engaging said flat edge to prevent rotation of said shackle-bolt, and a screw threaded into said overhanging shoulder portion and bearing on the head of the shackle-bolt to hold it in position.

3. A spring connection construction comprising a yoke member, having aligned openings in its arms, a shackle-bolt extending through said openings, a leaf-spring having a portion surrounding said bolt between said arms, said shackle-bolt having a head engaging the outer face of one of said arms to position it, said head having a flat edge, one arm on the yoke having an overhanging shoulder having a flattened portion for engaging said flat edge to prevent rotation of said shackle-bolt, and a screw threaded into said overhanging shoulder portion and bearing on the head of the shackle-bolt to hold it in position, the end of said shackle-bolt being tapered to facilitate its insertion through said openings.

4. A spring connection construction comprising a yoke member, having aligned openings in its arms, a shackle-bolt extending through said openings, a leaf-spring having a portion surrounding said bolt between said arms, said shackle-bolt having a head engaging the outer face of one of said arms to position it, and means on said yoke cooperating with the head of said shackle-bolt for preventing the bolt from rotating, and for keeping it from slipping endwise out of the yoke, one end of said bolt being tapered to facilitate the placing of the bolt in position, this end of the bolt carrying no securing or retaining means.

5. A spring connection construction comprising a yoke member, having aligned openings in its arms, a shackle-bolt extending through said openings, a leaf-spring having a portion surrounding said bolts between said arms, said shackle-bolt having a head engaging the outer face of one of said arms to position it, said head having a flat edge, said yoke having a flat portion for engaging said flat edge to prevent rotation of said shackle-bolt and means on said yoke for keeping said bolt from slipping out endwise, one end of said bolt being tapered to facilitate the placing of the bolt in position, this end of the bolt carrying no securing or retaining means.

In witness whereof, I have hereunto subscribed my name.

JOSEPH J. RATH.

Witness:
E. ROGER BURLEY.